(12) United States Patent
Lampke et al.

(10) Patent No.: US 8,808,590 B2
(45) Date of Patent: Aug. 19, 2014

(54) PELLETIZING DEVICE AND METHOD

(75) Inventors: Jan Lampke, Tiefenort (DE); Steffen Silge, Münster (DE); Gunther Schurig, Oschatz (DE); Vincent Delatour, Gütersloh (DE); Sandra Weyrauch, Freiberg (DE)

(73) Assignee: Haver Engineering GmbH, Meissen (DE)

( * ) Notice: Subject to any disclaimer, the term of this patent is extended or adjusted under 35 U.S.C. 154(b) by 82 days.

(21) Appl. No.: 13/638,295

(22) PCT Filed: Mar. 28, 2011

(86) PCT No.: PCT/EP2011/001538
§ 371 (c)(1),
(2), (4) Date: Jan. 14, 2013

(87) PCT Pub. No.: WO2011/124336
PCT Pub. Date: Oct. 13, 2011

(65) Prior Publication Data
US 2013/0113132 A1    May 9, 2013

(30) Foreign Application Priority Data

Mar. 29, 2010 (DE) .......................... 10 2010 013 096

(51) Int. Cl.
*B29B 9/08* (2006.01)
*B01J 2/14* (2006.01)

(52) U.S. Cl.
CPC ..... *B29B 9/08* (2013.01); *B01J 2/14* (2013.01)

USPC ......... 264/117; 264/40.4; 264/40.5; 425/140; 425/150; 425/222; 425/332; 23/313 P (58) Field of Classification Search
None
See application file for complete search history.

(56) References Cited

U.S. PATENT DOCUMENTS

| 3,030,657 | A | * | 4/1962 | Von Reppert | .................. 425/222 |
| 4,214,863 | A | | 7/1980 | Nixon | |
| 4,504,306 | A | * | 3/1985 | Miyashita et al. | ............... 75/756 |
| 4,973,237 | A | * | 11/1990 | Hajou et al. | .................... 425/92 |
| 5,124,104 | A | * | 6/1992 | Holley | ........................ 264/113 |

FOREIGN PATENT DOCUMENTS

| DE | 12 76 003 B | 8/1968 |
| DE | 29 17 279 A1 | 11/1979 |
| JP | 7 068148 A | 3/1995 |

* cited by examiner

*Primary Examiner* — Mary F Theisen
(74) *Attorney, Agent, or Firm* — Pearne & Gordon LLP (57) ABSTRACT

Pelletizing device and method for pelletizing pelletizing materials having a pelletizing disk inclined to the horizontal and provided rotatable wherein the pelletizing disk is driven via a motor device. The pelletizing disk comprises a bottom and a side wall, the effective height of the side wall being variable. The side wall comprises an inner side wall device and an outer side wall device, the inner side wall device being disposed height-adjustable relative to the outer side wall device.

16 Claims, 4 Drawing Sheets

PELLETIZING DEVICE AND METHOD

The present invention relates to a pelletizing device for pelletizing matter suitable for pelletizing to facilitate or allow handling, storage, and processing e.g. by way of agglomeration. For example flowability may be improved and dust production, reduced.

Although the invention will be described below substantially with reference to manufacturing pellets of iron ore for steelmaking, the pelletizing device according to the invention may likewise be used for the agglomeration or pelletizing of other substances suitable for pelletizing. For example other than primary materials, secondary materials such as fertilizers, filter dust, or other mixtures or residual materials may be pelletized for better handling and/or to prevent segregation so as to obtain a product offering ease of processing.

In the prior art pelletizing devices have become known which reliably process e.g. powdery or finely divided, suitable pelletizing materials to obtain pellets. For example a pelletizer has become known with DE 29 17 279 having a circular disk with a circumferential rim that is rotatable about an inclined axis. The premixed pelletizing material and optionally a bonding agent are fed on the disk. Ploughs above the disk cause a consistent level of the bottom layer of the bulk material to be pelletized. With the rotary motion of the disk the pelletizing material agglomerates. The discharged pellets are classified. Any pellets that are not yet sufficiently agglomerated are fed back into the process.

The prior art disclosed in DE 29 17 279 operates reliably. By way of varying the rotational speed of the disk and adapting the bonding agent feed, the operating parameters can be modified so as to allow adjusting the pelletizer to different operating conditions within a certain scope.

The drawback of this known prior art is, however, that only few variable parameters and comparatively narrow limits are available for setting the operating conditions.

Due to seasonal differences in ambient humidity and different storage conditions of the pelletizing material the same operating conditions result in different finished pellet sizes.

With JP 07068148 A another pelletizing disk has been published. Applicant is not aware of a pelletizing system according to JP 07068148 A in the market. JP 07068148 A describes that the size distribution of the pelletized pellets is measured at periodic intervals. The finished pellets are intended to be manufactured within the desired diameter range between 5 and 15 mm. To keep the diameter distribution of the pellets in the desired range, the rotational speed, the inclination angle of the pelletizing disk and the volume of the processing space are readjusted as required via modifying the side wall height.

Many different trials of applicant to construct a pelletizing disk with a telescoping extendable side wall for varying the size of the processing space as required, have not yielded usable results. As a rule the pelletizing particles deposited in powdered form used to end up caked between the side walls which are displaceable in opposite directions, thus impeding or even prohibiting height adjustment.

A solution with an adjustable side wall with a bellows-type cover has been considered. It would appear unlikely though that bellows can for years withstand the loads occurring in continuous operation.

Basically a pelletizing system is desirable which allows to reliably vary the processing space volume.

It is therefore the object of the present invention to provide a pelletizing device in which the size of the processing space can be variably and permanently reliably adjusted to different operating conditions.

This object is solved by a pelletizing device having the features according to the present invention. A method according to the invention is also presented herein. Preferred specific embodiments of the invention are defined in the subclaims. Further advantages and configurations of the invention can be taken from the exemplary embodiments.

A pelletizing device according to the invention for pelletizing pelletizing materials comprises at least one pelletizing disk inclined to the horizontal and provided rotatable. The pelletizing disk can be driven via a motor device. The pelletizing disk comprises at least one bottom and at least one side wall. The bottom and the side wall open up a processing space. The pelletizing process is carried out in the processing space. The size of the processing space is variable by way of varying an effective height of the side wall. The side wall comprises an inner side wall device and an outer side wall device, the inner side wall device being disposed height-adjustable relative to the outer side wall device.

A pelletizing device according to the invention has many advantages. Surprisingly it has been found that a displaceable, inside side wall device leads to the desired result. With an external adjustable side wall device, however, adjustability tends to be blocked an inadmissible number of times. Now it is very amazing that it works with an adjustable inside side wall device. Namely, the adjustable inside side wall device is continuously exposed to the pelletizing material.

An adjustable outside side wall as it is known e.g. from JP 07068148 A, also tends to jam due to matter sitting in-between, and leaking. Reliable operation for many years and decades does not appear possible. The adjustable side wall device which according to the invention is inside, however, operates reliably even given highest loads.

A considerable advantage of the pelletizing device according to the invention lies in that the volume of the processing space can be varied reliably and over long periods of time in particular also during operation. The processing space which as a rule is an open-top type is on the whole defined by the bottom and the side wall. The variable size of the processing space allows to effectively considerably influence the residence time. The performance and the portion of the useful grain fraction can be enhanced.

Since the feed material is uneven in quality over time and/or depending on its origins and since storage conditions and the humidity content of the processed materials differ, consistent conditions cause the forming of pellets of different sizes, firmness, and compactness, which is undesirable. The invention allows an automatic and continuous adjustment of a great variety of parameters, in particular including the effective side wall height, such that the desired results can be reliably observed.

Additionally it is possible to vary the processing space diameter for enlarging the processing space size. As a rule a larger-diameter processing space with otherwise unchanged conditions will result in increased throughput while a smaller processing space will lead to decreased throughput. Thus the throughput of the manufactured pellets may be influenced via the diameter of the processing space.

By way of increasing the processing space height a longer residence time is achieved and thus larger pellets are discharged on average while decreasing the processing space height causes a shorter residence time and thus discharging smaller pellets on average.

It is also advantageous that via the residence time and optionally other parameters the compactness and porosity of the generated pellets can be influenced as well.

A considerable advantage of the pelletizing device according to the invention is that the effective height of the side wall can be quickly changed and in particular adjusted in dependence on the pelletizing material or else on its current properties and/or on the properties of the manufactured pellets. This allows flexible and rapid responses to the currently prevailing requirements. The performance of the pelletizing device according to the invention can be considerably increased and rejects, considerably reduced. The processing space is in particular confined by the effective side wall height and the bottom. The processing space which as a rule is an open-top type can be enlarged by enlarging the effective side wall height. This enlargement is possible by lifting the side wall or e.g. by lowering the entire or at least parts of the bottom.

In the pelletizing process the pelletizing bulk materials are deposited on the pelletizing disk and as a rule rotate a number of times with the pelletizing disk before the finished pellet leaves the pelletizing disk over the side wall.

Agglomeration is presently understood to mean the transfer of fines or fine-grained materials to nodulized products having improved transport and/or processing and/or functional properties. What is decisive for agglomeration is, attractive forces between particles. Attractive forces may act between particles e.g. in the shape of capillary forces by means of liquid bridges, solid bridges, and Van der Waals forces.

The processing space of the pelletizing disk may be formed by an inclined and rotating, flat cylindrical vessel. The deposited fines are entrained due to the vessel's rotation in dependence on the operating conditions such as e.g. the speed of rotation and the setting angle, e.g. up to the highest position of the disk from where they roll off on a material bed. To generate better or suitable bonding conditions the material may e.g. be sprayed with a bonding agent from above.

In pelletizing the smallest particles are as a rule first located near the bottom of the pelletizing disk. When e.g. liquid bridges form, pellet nuclei are generated which migrate to the top on the fines in the material bed. This pellet growth process may be superposed by a continuous pellet disintegration. Due to the predominant adhesive forces further particles and pellet nuggets accumulate until the agglomerates are large enough to be discharged over the side wall or beyond the disk edge due to the acting gravity. Due to this segregation effect the pellets manufactured in the pelletizing disk may comprise a very close grain-size distribution.

Ploughs may be employed to prevent material from caking in the processing space. These optionally stationary or dynamic systems may result in an additional vertical component of thorough material mixing.

However, even given an intentional influencing of the rotational speed, the inclination angle and addition of bonding agents, water or the like, a certain portion of the discharged pellets will show a diameter range outside of the desired diameter range. Too small and too large pellets may be reworked and fed back to the process.

The inventive pelletizing device in which the effective side wall height is adjustable through adjusting the inner side wall device allows to markedly increase the proportion of pellets in the desired useful grain range. This increases the effectiveness of the pelletizing device so as to obtain a considerable higher yield. With the dimensions unchanged and the operating conditions unchanged, the quantity of the useful grain fraction produced considerably increases.

The pelletizing disk side wall may be structured as a simple or else a complex system. The side wall may comprise an inner side wall device and an outer side wall device. Or else a telescoping structure of the side wall of two or more side wall components is possible.

It is in particular possible for the bottom and the side wall device to be provided movable and in particular displaceable relative to one another. The bottom or at least part of the bottom may be provided movable and in particular displaceable relative to a stationary side wall device. It is also preferred for both the bottom and the inner side wall device to be provided movable at least in part.

It is also possible to provide only part of the bottom height-adjustable, for example a central, inner, or an outer, or another area.

In preferred configurations at least one adjustment device is provided for adjusting the effective side wall height. In particular a hydraulic device is preferred for height-adjusting the side wall. An adjusting motor is in particular also possible and preferred which causes height adjustment of the side wall for example via a spindle drive or a gear rack or the like. In the case of large pelletizing devices involving large throughput, hydraulic adjustment devices offer advantages since they can transmit large forces. Spindle drives on the other hand are flexible in use and allow to arrange multiple spindle drives distributed around the circumference of a pelletizing disk as needed.

In a preferred specific embodiment the inner side wall device is provided height-adjustable via several push rods. For example the adjustment device may via the push rods act on the side wall device centrally or distributed in several places. Or else it is possible for one or more push rods to be provided with a spindle or the like onto which corresponding adjusting motors act in a coordinated way. Preferably the push rods are guided through bearings and in particular linear bearings to reduce friction.

In preferred configurations of the invention the inclination angle of the pelletizing disk is changeable and in particular adjustable. The inclination angle of the pelletizing disk can preferably be changed at least in standstill. Or else it is possible for the inclination angle of the pelletizing disk to be changeable in operation and in particular even automatically changeable.

Preferably at least one driving device is provided for adjusting the inclination angle of the pelletizing disk.

It is particularly preferred for the effective height of the side wall of the pelletizing disk to be changeable preferably automatically at least in standstill and in particular during operation. This allows to quickly adapt in operation the effective height of the side wall of the pelletizing disk to the current conditions and/or requirements.

It is preferred to provide at least one sensor device for capturing the current height of the side wall. It is also possible for the adjusting drive of the side wall to capture its position autonomously via absolute rotational angle transmitters or the like.

In particularly preferred configurations at least one sensor device is provided for capturing the sizes and/or the shapes of the finished, discharged pellets. For example instead of the size of the pelletized pellets the mass fraction and/or the volume fraction of the discharged pellets lying in the desired diameter range may be determined. Or else the mass fraction of the pellets having too large and/or too small diameters is determined. Or else capturing the diameter of the manufactured pellets is possible using e.g. optical measuring methods.

Preferably at least one parameter of the pelletizing material is captured. For example the humidity content in the pelletizing material can be measured. A great variety of measurements of chemical or physical properties of the pelletizing material is possible. In particular it is also possible to capture the size distribution of the materials to be deposited and pelletized.

By measuring one or more parameters of the pelletizing material and by linking these parameters with the current operating parameters and the size distribution of the manufactured pellets, the operating performance may be improved and even optimized by way of a control device.

In particular is it possible by measuring at least one parameter of the pelletizing material and by capturing the size or at least one other parameter of the finished pellets to accordingly adapt the effective height of the side wall and/or the speed of the pelletizing disk and/or the inclination angle of the pelletizing disk to achieve the most effective throughput. The maximum speed of the pelletizing disk is as a rule limited to ensure that the formed pellets can roll off.

In particular is it possible to vary the addition of additives and/or water or other liquids or solids. The quantity of the supplied bonding agent can for example be adjusted. Addition is possible and preferred prior to depositing the pelletizing material onto the pelletizing disk and/or on the pelletizing disk.

In preferred configurations at least one plough is provided on the pelletizing disk. Such ploughing serves to regulate the layer thickness on the bottom and/or to control the material bed on the whole.

Preferably the outer side wall device and the inner side wall device are spaced apart from one another at least in sections. The gap provided in-between at least in sections preferably has a gap width of larger than 1 mm and in particular larger than 5 mm. The gap width is in particular larger than $1/2000$ and preferably larger than $1/1000$ of the outer diameter of the side wall. In a specific configuration given about 7.5 m diameter the gap width is preferably between 5 mm and 20 mm. The gap width may depend on the processed product.

In theory the gap allows processed product to pass through to the outside since in operation the level of the processed material extends in the vertical direction until above the bottommost upper edge of the outer side wall. The labyrinth-like gap, however, reliably prevents product from escaping outwardly in the case of typical processed products.

The gap shows positive properties. The gap allows larger tolerances in manufacturing the pelletizing disk. Moreover a gap ensures free displaceability of the two side wall devices relative to one another. Increased resistance in height adjustment due to side wall devices rubbing against one another and in particular blocking by the side wall devices can be reliably prevented.

In the method according to the invention for pelletizing pelletizing materials at least one pelletizing disk is employed that is inclined to the horizontal and rotatably driven, comprising a bottom and a side wall. The effective height of the side wall is changed in dependence on the operating parameters and/or the material properties. The inner side wall device is height-adjusted relative to the outer side wall device for setting the effective height of the side wall.

The method according to the invention also has many advantages. A considerable advantage is that the capacity of the pelletizing disk is changeable and in particular changeable in operation. The effective height of the side wall of the pelletizing disk directly determines the quantity of the taken-up pelletizing material and thus also the residence time on the pelletizing disk.

Preferably the effective height of the side wall is adjusted at least also in dependence on the quality of the discharged pellets. In particular is the effective height of the side wall adjusted also in dependence on the rotational speed and/or the inclination angle of the pelletizing disk. It is also preferred to adjust the parameters in dependence on the quality of the pelletizing material.

In all the configurations the height and/or the setting angle of the ploughs for guiding the material bed may optionally be adjustable, the height being in particular adjusted in dependence on the current operating conditions.

Preferably the proportion of the supplied bonding agent and/or other additives is adjusted in dependence on the quality of the pelletizing material and/or the finished pellets.

Further advantages and features of the present invention can be taken from the exemplary embodiments which will be described below with reference to the enclosed figures.

These show in.

Figure 1:
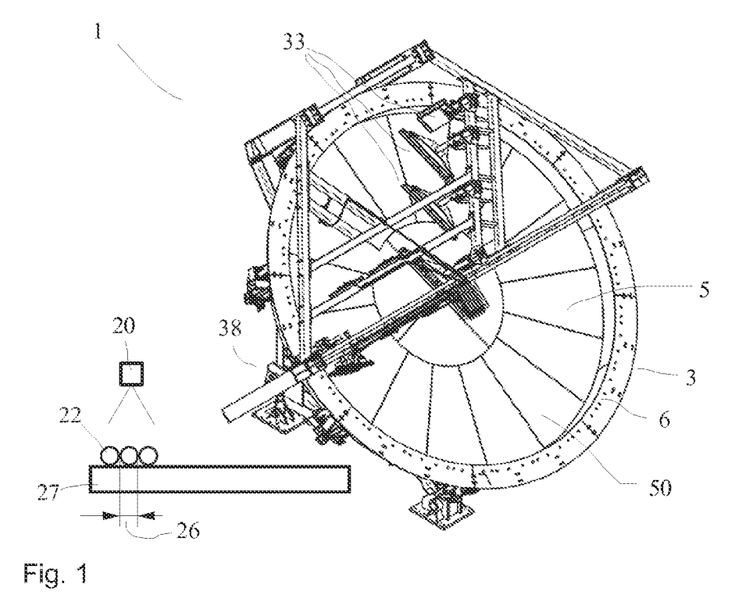
FIG. 1 a perspective total view of a first pelletizing device.

With reference to the FIGS. 1-7 a first exemplary embodiment of the present invention will now be explained. FIG. 1 shows an illustration of a perspective total view of a pelletizing device 1 comprising a pelletizing disk 3. The pelletizing disk 3 is held inclined at an angle 18 to the horizontal by means of a rack 38. The pelletizing device 1 is in particular designed for large throughput rates. Preferably a throughput rate of more than 25 metric tons per hour and in particular more than 50 metric tons per hour is achieved. Particularly preferably these systems show a throughput rate per pelletizing disk of more than 100 metric tons per hour.

Figure 2:
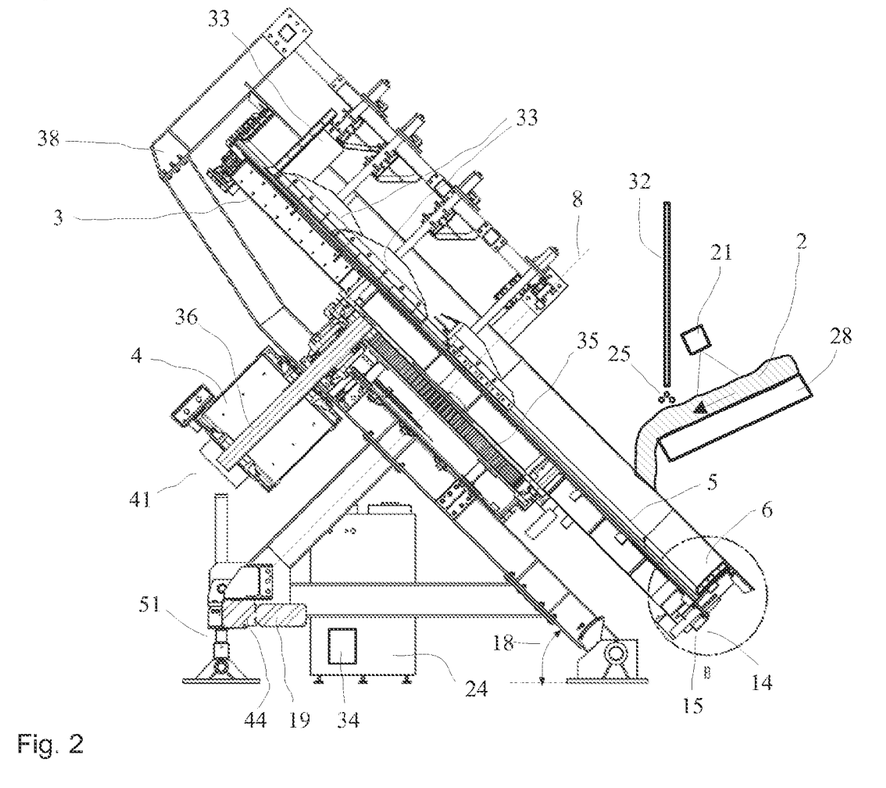
FIG. 2 a sectional side view of the pelletizing device in FIG. 1.

As can in particular be taken from FIG. 2, the pelletizing disk 3 is accommodated rotatable about a rotation axis 8 and is rotatably driven via a motor device 4. The motor device 4 is a torque motor 41 and presently configured as a synchronous motor 41. The torque motor 41 comprises a continuously magnetized runner or rotor which is synchronously driven by a rotating magnetic field in the surrounding stator.

In the selected exemplary embodiment the torque motor 41 comprises permanent magnets for generating the magnetic field in the runner. In operation the torque motor 41 shows a speed that is synchronous to the alternating voltage applied. In this way the speed of the torque motor 41 which has a predetermined number of pole pairs is linked with the frequency of the applied alternating voltage to thus achieve synchronous operation.

To adjust or vary the speed of the torque motor 41 and thus the speed of the pelletizing disk 3 an amplifier module 34 is provided which is controlled by the control device 24 to generate a corresponding alternating voltage frequency to be applied to the torque motor 41. The amplifier module 34 enables a transmitter-less operation of the torque motor 41 and in particular comprises at least one, or is configured as a, servo amplifier.

Employing the torque motor 41 offers considerable advantages since high rotational forces can be generated at low speeds of rotation with high efficiency. Employing torque motors in asynchronous structures is likewise possible.

Using such a torque motor 41 also offers the advantage over the high-speed asynchronous motors typically used in the prior art, of requiring little maintenance. Engine speed sensors are as a rule not necessary and coupling elements in the shape of rubber buffers or the like can be omitted. Employing a multi-stage transmission is likewise not required. The small number of individual components reduces maintenance work and the amount of spare parts supply. Furthermore, wear per se is reduced and the use of gear oil is largely unnecessary. Energy efficiency is enhanced since there is no loss of energy at the clutches and in the complicated transmission. Moreover the torque motor 41 is less susceptible to failure since a smaller number of mechanical components is used.

In another configuration it is also possible to use electromagnets instead of permanent magnets for generating the magnetic field in the runner. Current supply may occur e.g. via slip rings.

Three-phase synchronous motors may also be used which may comprise suitable sensors for capturing the motor position. Typically two phases are supplied with current while the third phase is switched currentless. A corresponding rotating switching of the individual phases generates a rotating magnetic field which drives the motor.

For saving separate sensors and for capturing the direction of rotation it is also possible to specify by controls which of the phases is to be currentless to thus control the direction of rotation and motor speed. This sensor-less drive concept further reduces maintenance requirements and possible fault susceptibility.

Or else it is possible to employ other driving concepts such as electric asynchronous motors with a clutch and transmission combination or other driving devices.

In the pelletizing device 1 the torque motor 41 provided with the drive shaft 36 comprises a drive sprocket 40 which meshes with a toothed gear 35 of the pelletizing disk 3. Since the number of teeth of the toothed gear 35 is considerably larger than the number of teeth of the drive sprocket 40, the pelletizing disk 3 rotates considerably slower in operation than does the shaft 36 of the torque motor 41. A pelletizing disk of 7.5 m diameter typically achieves rotational speeds between approximately 2 and 10 rotations per minute and in particular between 4 and 7 rotations per minute. The typical peripheral speed is between 1 and 5 m per second. Preferably the peripheral speed is approximately 2 m per second.

When one regards the pelletizing disk 3 perpendicular to its surface and divides the bottom surface like a clock dial, the pelletizing material 2 is deposited in a region between approximately 4 to 5 hrs given a clockwise direction of rotation of the pelletizing disk regarding the processing space from above. Discharge of the finished pellets tends to occur between approximately 7 and 9 hrs. The pelletizing materials typically rotate a number of times with the pelletizing disk 3 until being discharged as finished pellets such that the residence time of the pelletizing materials 2 depends among other things on the diameter of the pelletizing disk 3, the rotational speed of the pelletizing disk 3, and the height of the side wall.

The processing space 50 of the pelletizing disk 3 is presently virtually formed by an inclined and rotating, flat cylindrical container. The deposited fines 2 are entrained due to the rotation of the pelletizing disk 3 in dependence on the operating conditions such as e.g. the speed of rotation and the setting angle 18 etc. far upwardly and optionally up to the highest position of the disk from where they roll back on the material bed downwardly where they are then once again entrained another time. To generate better bonding conditions the material 2 may e.g. be sprayed from above with a bonding agent and/or water. Known systems tend to require that following an unscheduled stop at least part of the pelletizing disk be manually emptied prior to restarting since the loads occurring when starting with the pelletizing disk filled up are too high for the drive train. Only a very complicated and thus expensive oversizing of all the drive components might provide a remedy. In contrast thereto, due to their structure torque motors are capable of applying a considerable overload moment in the starting phase.

The shaft 8 of the motor device 4 is provided with a sprocket 40. The shaft 8 is coupled with the toothed gear 35 of the pelletizing disk. The toothed gear 35 is fixedly connected with the pelletizing disk 3 such that no additional transmission stage is provided or necessary between the torque motor 41 and the pelletizing disk 3.

As a rule the pelletizing disk 3 shows an inclination angle 18 between 40 and 70 degrees to the horizontal. Typically the angle is in a range between 50 and 60 degrees and depends on the specific application and on the properties of the pelletizing materials. In a concrete exemplary embodiment and given specific operating parameters the angle 18 may be 56 to 57 degrees.

The inclination angle 18 of the pelletizing disk 3 can presently be adjusted continuously, automatically, and even during operation, via a motor-driven threaded spindle 51.

The speed of rotation of the pelletizing disk 3 can also be controlled continuously. A specific driving concept involving one or more torque motors 41 allows to start the disk even under full load. This is a considerable advantage over known pelletizing disks many of which allow starting only half filled or empty.

Due to the inclined position of the pelletizing disk 3 the larger pellets gather in the lower region of the pelletizing disk 3. The upper region of the pelletizing disk 3 is provided with ploughs 33 which ensure that the level of the filled-in pelletizing material 2 does not rise above a predetermined and optionally variable level and which support the pellets' rolling off.

A conveyor 28 conveys the pelletizing material 2 onto the pelletizing disk 3. A sensor device 21 may capture at least one property of the pelletizing material. For example the diameter of each pelletizing particle or a diameter distribution may be determined. Or else it is possible to determine the humidity content of the pelletizing material or further properties of the pelletizing material.

In dependence on the properties of the pelletizing material and also in dependence on the size distribution of the manufactured pellets and/or on further properties of the finished pellets an additive 25 or multiple additives 25 may be fed to the pelletizing disk 3 or to the conveyor 28 via an additive feed 32 for promoting the formation of pellets 22 or for generating suitable properties of the finished pellets 22.

The finished pellets 22 leave the pelletizing disk 3 over the upper edge of the side wall 6 and are conveyed off via a transfer device 27 that is indicated schematically only. A sensor device 20 may be provided which captures for example by way of optic methods single diameters 26 of the pellets generated or the pellet diameter distribution and/or one and/or several other parameter(s).

In particular are the generated pellets 22 classified by means of suitable screens to carry off as finished pellets the desired grain fraction only. In the concrete exemplary embodiment in pelletizing iron ore concentrate the useful grain fraction carried off shows diameters ranging from 9 to approximately 12.5 mm. Given a pelletizing disk diameter of 7.5 m a throughput of about 100 to 150 metric tons iron ore per hour is achieved.

Due to the segregation or unmixing effect on the pelletizing disk 3 which causes larger particles to rather migrate upwardly, a proportion of 70%, 75% or more of the pellets leaving the pelletizing disk is in the useful grain range.

The deposited materials in the present pelletizing of iron ore concentrate (Pellet Feed Fines: PFF) show typical diameters of less than 100 micrometers.

The pelletizing device 1 comprises a side wall 6, the effective height 7 of which is changeable and presently also adjustable during operation. A larger effective height 7 of the side wall 6 ensures a longer retention time of the pelletizing material 2 on the pelletizing disk 3 so as to enable an adaptation to the currently prevailing conditions. In the case of changing parameters this allows highly flexible and short-term adaptation during operation of the operating parameters of the pelletizing device 1. Thus, any negative consequences of changed conditions in respect of the useful grain fraction can be counterbalanced.

Since the typical retention time of the pelletizing materials 2 on the pelletizing disk 3 lies in the range of a few minutes, very quick responses to changing conditions are thus possible. If, however, the moisture is increased in an upstream process, the response time until the results of the finished pellets change is longer and may typically lie in the range of up to a few hours.

On the whole the pelletizing device 1 allows a considerable improvement of pellet conditioning. Changes to the effective height 7 of the side wall 6, as do changes in adding bonding agents and adjusting the rotational speed, allow flexible influence on the grain size generated. An increase of the effective height 7 of the side wall 6 increases the retention time so as to allow a marked increase in useful grain discharge with the same rotation speed if the pellets had been too small previously. The same applies in analogy to reversed relationships.

On the whole this achieves a considerable increase of efficiency and throughput of the system. Moreover, a variable height 7 of the side wall 6 results in that different parameters can be set in wide ranges given different materials or product requirements (e.g. size, thickness) for materials to be pelletized in the same system.

Figure 3:
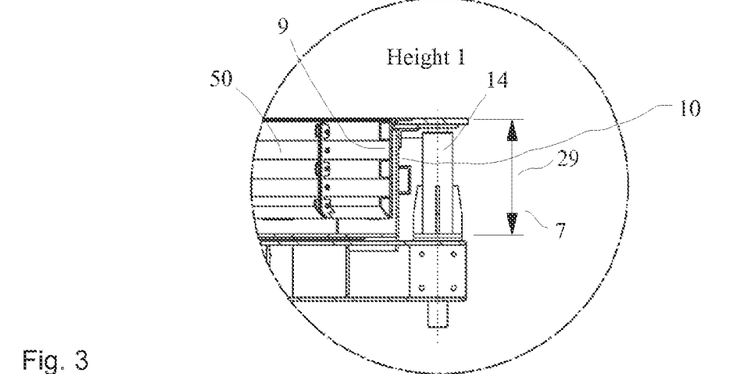
FIG. 3 the detail "B" in an enlarged illustration with the side wall in a first set height.
Figure 4:
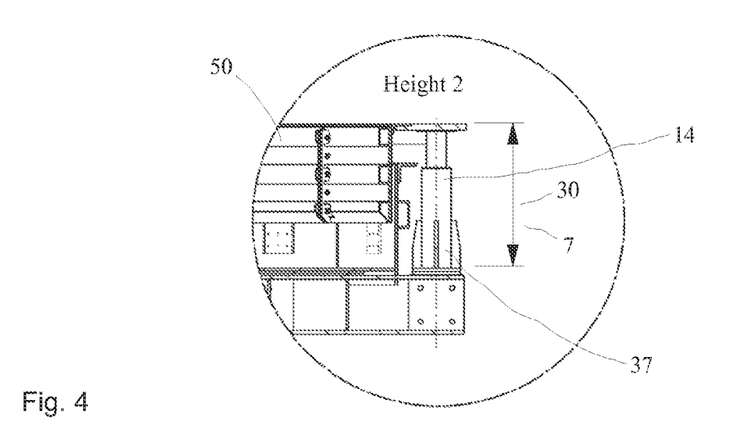
FIG. 4 the detail "B" with the side wall in a second set height.
Figure 5:
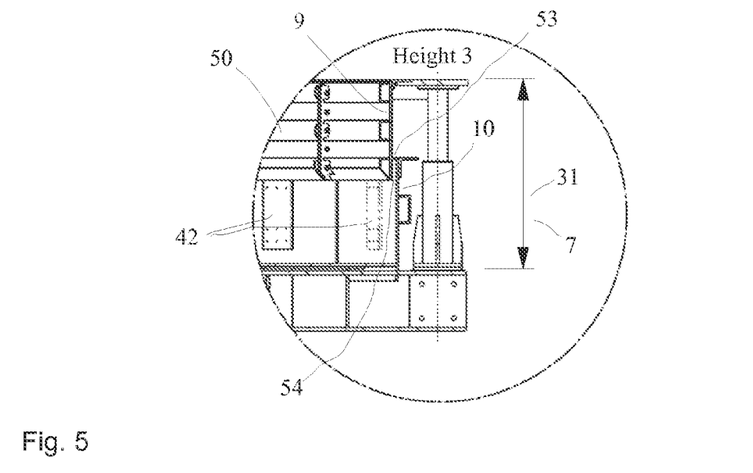
FIG. 5 the detail "B" with the side wall in a third set height.

The FIGS. 3-5 illustrate different settings of the effective height 7 of the side wall 6. The inner side wall device 6 is configured height-adjustable while the outer side wall device 10 is configured fixed. Adjusting the height of the side wall 6 presently occurs by means of an adjustment device 14 which is presently configured as a hydraulic device 15 and comprises several hydraulic cylinders 37 which, controlled by the control device 24, automatically lift or lower the inner side wall device 9, as is currently desired. Surprisingly it has been found that the inner, adjustable side wall device 6 allows a permanently reliable operation. No jamming of the displaceable side wall device 6 occurs in operation although when the effective height is reduced the side wall device 6 enters into the materials present on the pelletizing disk or pushes them away from the outer side wall device.

Figure 6:
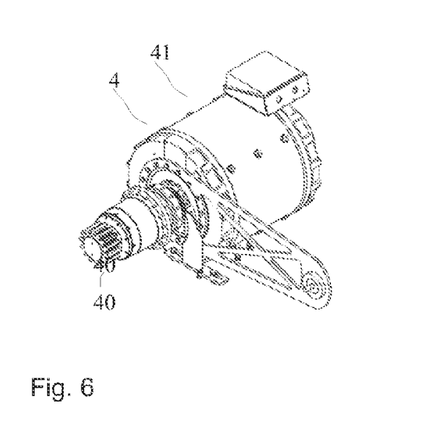
FIG. 6 the motor device for rotating the pelletizing disk according to FIG. 1.

In the position illustrated in FIG. 3 the effective height 7 corresponds to the lowest height 29. In FIG. 4 the side wall is illustrated at a medium height 30 while FIG. 6 illustrates the highest possible height 31. In this case the side wall can be set at a height range from approximately 50 cm to 90 cm. Still larger heights are structurally possible.

FIG. 6 is a separate illustration of the motor device 4 configured as a torque motor 41. One can clearly recognize the drive sprocket 40 at the torque motor 41. The amplifier module 34 which causes actuation of the single phases is illustrated in FIG. 2.

Figure 7:
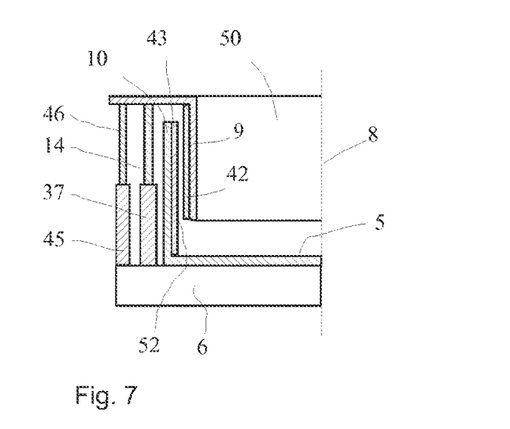
FIG. 7 an enlarged schematic cross-section of the side wall structure of the pelletizing disk according to FIG. 1.
Figure 8:
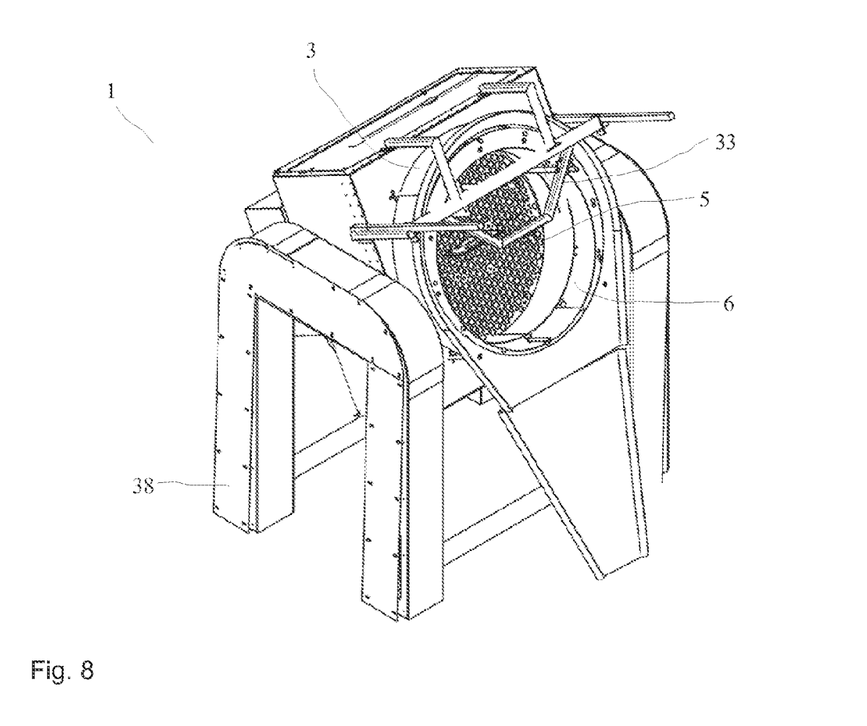
FIG. 8 a perspective view of a second exemplary embodiment of a pelletizing device.
Figure 9:
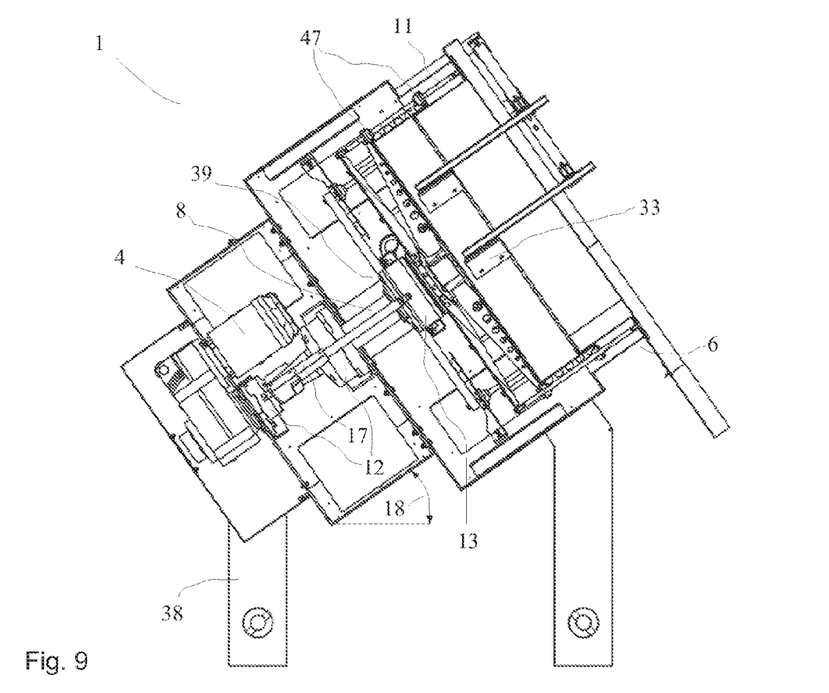
FIG. 9 a sectional side view of the pelletizing device according to FIG. 8.

FIG. 7 illustrates an enlarged schematic cross-section of the side wall structure of the pelletizing disk according to FIG. 1. FIG. 7 is not true to scale to facilitate overview and illustrate the function.

In this exemplary embodiment the supporting structure at the side wall 6 comprises several sliding guides distributed over the circumference each of which consists of a guide tube 45 in which two or more slide bushes are inserted. Within the slide bushes a guide rod 46 moves which is displaced according to the desired height setting.

Guide plates 42 configured as bronze baffles which among other things serve to stabilize positions are fixed to the inner side wall device 9 between the inner side wall device 9 and the outer side wall device 10. The bronze baffles presently slide on counterplates 43 of a wear-resistant sheet which may consist of a hard metal such as hardox which are in particular fixed to the outer ring 10.

A reversed structure with an adjustable side wall device on the outside has not proved successful since the materials are drawn between the two side wall devices. In this structure the side wall jammed such that a continuous operation with automatic side wall adjustment could not be ensured. Moreover, a pelletizing disk so configured is as a rule also leaky. The structure with an adjustable, inside side wall device, however, allows adjusting the effective height 7 of the side wall in operation while pelletizing continues. Thus—without stopping the system—continuous pelletizing is possible and quick responses to changing conditions are possible. Fully automatic, sensor-controlled operation is possible. Or else a manually initiated displacement of the inner side wall device 9 is possible to change the effective height 7 as needed.

The pelletizing disk 3 is substantially configured tight although a radial gap 52 between the inner side wall device 9 and the outer side wall device 10 is present, with a gap width 54 of presently approximately 15 mm which may be wider or narrower. In this exemplary embodiment gap widths 54 of 5 mm or 20 mm are likewise conceivable. Due to the labyrinth-like structure of the side wall the escape of large quantities of pelletizing materials is reliably prevented while at the same time simple adjustment of the effective height 7 of the side wall 6 is ensured. In particular a gap width larger than the intended pellet diameter moreover prevents the gap from clogging up in operation. Particles entering the gap fall back into the pelletizing disk during rotation if this gap region comes to be above the product level during rotation.

Typically this pelletizing device 1 for pelletizing iron ores or the like is operated continuously for nine months before the pelletizing device 1 is serviced. Such thorough servicing may take several weeks. Thereafter the pelletizing disk 3 must again run continuously for a long period without any intermediate stops. If a conventional asynchronous motor is employed, manual emptying with shovels may be necessary in the case of an intermediate stop. For scheduled stops a conventional pelletizing disk must first run empty. Namely, the asynchronous motors used in large plants running at high speeds cannot produce the required drive torque with low speeds of rotation. Only a very considerable and thus very expensive oversizing of the conventional asynchronous motor might allow restarting in a filled state. The presently employed torque motor also allows starting in a filled state since this motor can apply a very high rotational force already from standstill. In a concrete example for pelletizing iron ore, given a pelletizing disk diameter of approximately 7.5 m, the motor has a nominal torque of more than 40 kNm and a short-term maximum torque of more than 60 kNm which may be applied e.g. in starting.

With reference to the FIGS. 8 to 11 another exemplary embodiment of a pelletizing device 1 according to the invention is illustrated. Unlike the preceding exemplary embodiment in which the pelletizing disk 3 has a diameter of approximately 7.5 m, the pelletizing disk 3 in the exemplary embodiment according to FIG. 7 has a diameter of approximately 1 m. The pelletizing disk 3 comprises a bottom 5 and a side wall 6 which in turn is configured height-adjustable via an inside side wall device 9 while the outer side wall device 10 is configured fixed.

In the present exemplary embodiment the adjustment device 14 is provided with a spindle drive 17 which is connected with the inner side wall device 9 via push rods 11.

Figure 10:
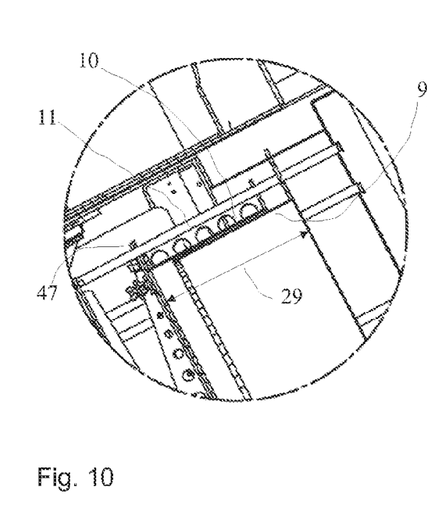
FIG. 10 an enlarged detail of the side wall of the pelletizing device according to FIG. 8 in a first set height.
Figure 11:
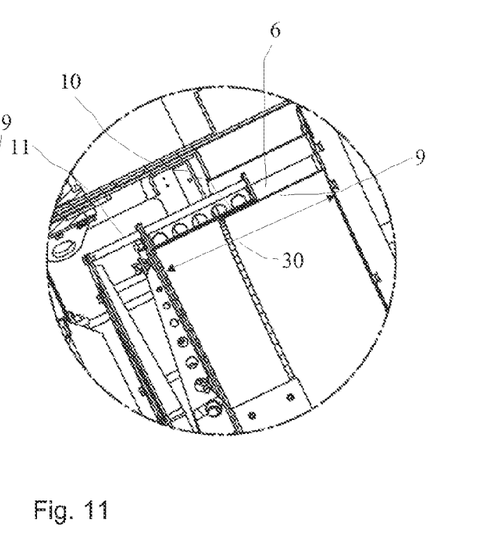
FIG. 11 an enlarged detail of the side wall of the pelletizing device according to FIG. 8 in a second set height.

As illustrated in the FIGS. 10 and 11, the effective height 7 of the side wall can be varied for example between a height 29 and a height 30 to meet what are the current requirements.

While the torque motor 41 from the exemplary embodiment according to the FIGS. 1-7 comprises a power of up to 260 kW, the drive motor according to the exemplary embodiment of the FIGS. 8-11 may be considerably smaller. Typically the speed of the pelletizing disk increases as the outer diameter decreases and moreover in all the cases it also varies with the pelletizing material. The speed ratio is not required to be linearly congruent with the diameter ratio.

In this exemplary embodiment the supporting structure at the side wall may comprise sliding guides 47 consisting of a guide in which two or more slide bushes are inserted.

Other than being employed for manufacturing iron ore pellets and the other materials indicated initially these pelletizing devices 1 may be employed for manufacturing detergents and feedstuffs, and for processing residues, waste, filter dusts, organic substances or slags e.g. from power plants. Due to the present configuration of the invention, energy requirement is reduced and the proportion of high-quality pellets is markedly increased. The outsize proportion is reduced and productivity increases. The desired pellet properties can be adjusted better.

The height adjustment of the side wall 6 allows to markedly increase the processing space in the interior of the pelletizing disk 3 and to adapt to the current conditions. An automatic and permanently reliable operation is possible.

LIST OF REFERENCE NUMERALS

| | |
|---|---|
| 1 | pelletizing device |
| 2 | pelletizing material |
| 3 | pelletizing disk |
| 4 | motor device |
| 5 | bottom |
| 6 | side wall |
| 7 | effective height |
| 8 | rotation axis |
| 9 | inner side wall device |
| 10 | outer side wall device |
| 11 | push rod |
| 12 | bearing |
| 13 | linear bearing |
| 14 | adjustment device |
| 15 | hydraulic device |
| 17 | spindle drive |
| 18 | inclination angle |
| 19 | driving device |
| 20 | sensor device |
| 21 | sensor device |
| 22 | pellet |
| 24 | control device |
| 25 | additive |
| 26 | diameter |
| 27 | transfer device |
| 28 | conveyor |
| 29 | height |
| 30 | height |
| 31 | height |
| 32 | additive feed |
| 33 | plough |
| 34 | amplifier module |
| 35 | toothed gear |
| 36 | shaft |
| 37 | hydraulic cylinder |
| 38 | rack |
| 39 | bearing bush |
| 40 | sprocket |
| 41 | torque motor |
| 42 | guide plate |
| 43 | counterplate |
| 44 | transmission |
| 45 | guide tube |
| 46 | guide rod |
| 47 | sliding guide |
| 50 | processing space |
| 51 | threaded spindle |
| 52 | gap |
| 54 | gap width |

The invention claimed is:

1. Pelletizing device (1) for pelletizing pelletizing materials (2) having at least one pelletizing disk (3) inclined to the horizontal and provided rotatable, the pelletizing disk (3) being drivable via a motor device (4), and wherein the pelletizing disk (3) comprises at least one bottom (5) and at least one side wall (6), the bottom (5) and the side wall (6) opening up a processing space (50) whose size is variable in that an effective height (7) of the side wall (6) is variable, characterized in that the side wall comprises an inner side wall device (9) and an outer side wall device (10) wherein the inner side wall device (9) is disposed height-adjustable relative to the outer side wall device (10).

2. The pelletizing device (1) according to claim 1 wherein at least one adjustment device (14) is provided for adjusting the effective height (7) of the side wall (6).

3. The pelletizing device (1) according to claim 1, wherein at least one controllable drive is provided for adjusting the effective height (7) of the side wall (6).

4. The pelletizing device (1) according to claim 1 wherein automatic adjustment of the effective height (7) of the side wall (6) is provided including during operation.

5. The pelletizing device (1) according to claim 1 wherein at least one sensor device (20, 21) is provided.

6. The pelletizing device (1) according to claim 1 wherein at least one control device (24) is provided.

7. The pelletizing device (1) according to claim 1 wherein the effective height (7) of the side wall (6) is automatically adjustable by means of a control device (24) by way of the sensor data of a sensor device (20, 21).

8. The pelletizing device (1) according to claim 1 wherein at least the inner side wall device (9, 10) is provided height-adjustable via several push rods (11).

9. The pelletizing device (1) according to claim 1 wherein the effective height (7) of the side wall (6) is adjustable at least in part via at least one hydraulic cylinder device and/or at least one spindle drive and/or at least one gear rack.

10. The pelletizing device (1) according to claim 1 wherein the inclination angle (18) of the pelletizing disk (3) is adjustable wherein in particular at least one driving device (19) for adjusting the inclination angle (18) of the pelletizing disk (3) is provided.

11. The pelletizing device (1) according to claim 1 wherein at least one sensor device (20, 21) is provided for capturing the size of the pelletized pellets (22) and/or of at least one parameter (23) of the pelletizing material (2).

12. The pelletizing device (1) according to claim 1 wherein a control device (24) is also provided for controlling the speed of rotation of the pelletizing disk (3) and/or the inclination angle (18) of the pelletizing disk (3).

13. The pelletizing device (1) according to claim 1 wherein a free gap is provided at least in sections between the outer side wall device (10) and the inner side wall device (9).

14. Method for pelletizing pelletizing materials (2) comprising at least one pelletizing disk (3) inclined to the horizontal and rotatably driven, with a bottom (5) and a side wall (6), wherein a size of the processing space (50) is changed by way of an effective height (7) of the side wall (6) in dependence on operating parameters wherein the inner side wall device is height-adjusted relative to the outer side wall device for adjusting the effective height of the side wall.

15. The method according to claim 14 wherein the effective height (7) of the side wall (6) is adjusted in dependence on the quality of the discharged pellets (22) and/or the type and quality of the deposited materials.

16. The method according to claim 14 wherein a rotational speed and/or an inclination angle (18) of the pelletizing disk (3) is adjusted in dependence on the quality of the discharged pellets (22) and/or the type and quality of the deposited materials.

* * * * *